US005148228A

United States Patent [19]

Takano

[11] Patent Number: 5,148,228

[45] Date of Patent: * Sep. 15, 1992

[54] IMAGE RECORDING APPARATUS

[75] Inventor: Masatoshi Takano, Tokyo, Japan

[73] Assignee: Asahi Kogaku Kogyo Kabushiki Kaisha, Tokyo, Japan

[*] Notice: The portion of the term of this patent subsequent to Sep. 3, 2008 has been disclaimed.

[21] Appl. No.: 689,110

[22] Filed: Apr. 24, 1991

Related U.S. Application Data

[63] Continuation of Ser. No. 422,593, Oct. 17, 1989, abandoned.

[30] Foreign Application Priority Data

Oct. 17, 1988 [JP] Japan .......................... 63-135253[U]

[51] Int. Cl.[5] .............................................. G03B 21/00

[52] U.S. Cl. .................................... 355/308; 355/317

[58] Field of Search ................... 355/23, 24, 308, 311, 355/317, 319, 322

[56] References Cited

U.S. PATENT DOCUMENTS

| | | | |
|---|---|---|---|
| 2,729,136 | 1/1956 | Feick et al. | 88/14 |
| 3,415,509 | 12/1968 | Tyburski et al. | 271/75 |
| 3,647,292 | 3/1972 | Weikel, Jr. | 355/274 |
| 3,697,170 | 10/1972 | Bhagat et al. | 355/274 X |
| 3,711,196 | 1/1973 | Carreira et al. | 355/274 |
| 3,830,589 | 8/1974 | Allen | 355/274 |
| 3,976,370 | 8/1976 | Goel et al. | 355/315 |
| 4,162,843 | 7/1979 | Inoue et al. | 355/327 |
| 4,204,731 | 5/1980 | Kohler et al. | 355/217 |
| 4,389,112 | 6/1983 | Ogata et al. | 355/274 |
| 4,443,095 | 4/1984 | Tsushima et al. | 355/274 X |
| 4,585,336 | 4/1986 | Tanaka | 355/319 |
| 4,737,816 | 4/1988 | Inoue et al. | 355/274 X |
| 4,870,434 | 9/1989 | Negishi et al. | 346/160 |
| 4,908,673 | 3/1990 | Muramatsu | 355/311 |
| 4,912,490 | 3/1990 | Negoro et al. | 346/160 |
| 4,924,266 | 5/1990 | Negoro et al. | 355/205 |
| 4,952,974 | 8/1990 | Mori | 355/260 X |
| 5,016,029 | 5/1991 | Mori et al. | 346/160 |

FOREIGN PATENT DOCUMENTS

| | | |
|---|---|---|
| 63-97975 | 4/1988 | Japan . |
| 63-121062 | 5/1988 | Japan . |
| 63-109962 | 7/1988 | Japan . |
| 63-187273 | 8/1988 | Japan . |

*Primary Examiner*—Brian W. Brown
*Assistant Examiner*—Khanh Dang
*Attorney, Agent, or Firm*—Sandler, Greenblum & Bernstein

[57] ABSTRACT

An image recording apparatus wherein a recording medium is fed in a predetermined feed path. The apparatus is provided with a pair of edge holders opposedly arranged about the feed path for holding edge portions of the recording medium. One of the edge holders is provided with an edge holding space extending along the feed path and having a substantially S-shaped sectional configuration.

4 Claims, 6 Drawing Sheets

IMAGE RECORDING APPARATUS

This application is a continuation, of application Ser. No. 07/422,593, filed Oct. 17, 1989, now abandoned.

BACKGROUND OF THE INVENTION

This invention relates to an image recording apparatus utilizing an electrophotographic system such as a laser beam printer.

Conventionally, there is known an image recording device utilizing an electrophotographic system in which a surface of a photoconductive drum is exposed to light to form a latent image on the drum surface. Toner then applied to the latent image to develop the image, and the developed image is transferred onto a recording sheet and is fixed by a fixing unit. Such an image recording device is chiefly employed in copying machines. In recent years, however, the image recording device has been utilized in printers and the like for printing the output from a computer, one of which is a laser beam printer.

The laser beam printer comprises, as one example is illustrated in FIG. 1, a photoconductive drum 1. Arranged about the photoconductive drum 1 in due order in rotational direction thereof are a charging station A, an exposure station B, a developing station C, a transferring station D, a toner-cleaning station E, and a discharge station F.

The arrangement is such that at the exposure station B, the laser beam scans the surface of the drum 1 which has been uniformly charged at the charging station A, to thereby form a latent image on the charged drum surface. Toner is then applied at the developing station C to the latent image to develop the same. Subsequently, the developed toner image is transferred at the transferring station D onto the recording sheet P which travels at a velocity identical with the circumference speed of the photoconductive drum 1.

The recording sheet P, carrying the toner image transferred thereon at the transfer station D, is guided and/or conveyed by guide rollers to a fixing station G. The recording sheet P is heated or pressed at the fixing station G for the toner image to be fixed on the surface of the recording sheet P.

When the recording sheet is arranged so that it is ejected with its image-carrying side up (with the printed side up) as shown in FIG. 1 (so-called "faceup ejecting"), the recording sheet is readily guided by holding the underside (i.e. undersurface) thereof without the toner image as far as the conveyance direction is concerned.

However, printers are normally used to print out the sheets continuously and if the sheets are ejected with the image-carrying surfaces up, they will be stacked in inverted order of pages. As a result, it has been desired for the laser beam printers to be able to exhaust the sheets with their image-carrying surfaces down (so-called "facedown ejecting") so that the sheets are stacked in the order of pages.

The functional stations (including the charging, exposure, developing, transferring, toner-cleaning and discharge stations, A, B, C, D, E and F), respectively with respect the photoconductive drum are disposed in such a manner as to arrange the transfer unit above the photoconductive drum. The recording sheet with the printed side down can thus be exhausted in facedown condition.

With this arrangement, however, the toner image is transferred to the undersurface of the recording sheet and accordingly the undersurface of the recording sheet cannot be used to hold it for feeding from the transfer station to the fixing station. The problem is that the recording sheet cannot be guided to the fixing unit properly.

What has heretofore been proposed to meet the foregoing requirement is that the recording sheet is turned upside down before being exhausted by guiding the recording sheet along a sheet exhaust path inversely extending from the fixing station inside the printer up to the same side as the sheet introduction side.

However, with the aforementioned arrangement, the recording sheet feed path inside the printer becomes long and complicated, which causes jamming and so on, and further, the printer tends to be large-sized.

SUMMARY OF THE INVENTION

It is therefore an object of the present invention to provide an improved image recording apparatus capable of guiding and holding the recording sheet carrying a toner image thereon.

In order to accomplish the aforementioned object, according to the present invention, an image recording apparatus wherein a recording medium is fed in a predetermined feed path, comprises:

a pair of edge holders opposedly arranged about the feed path for holding edge portions of the recording medium, one of the edge holders being provided with a edge holding space extending along the feed path and having a substantially S-shaped sectional configuration.

DESCRIPTION OF THE ACCOMPANYING DRAWINGS

DESCRIPTION OF THE EMBODIMENTS

Figure 1:
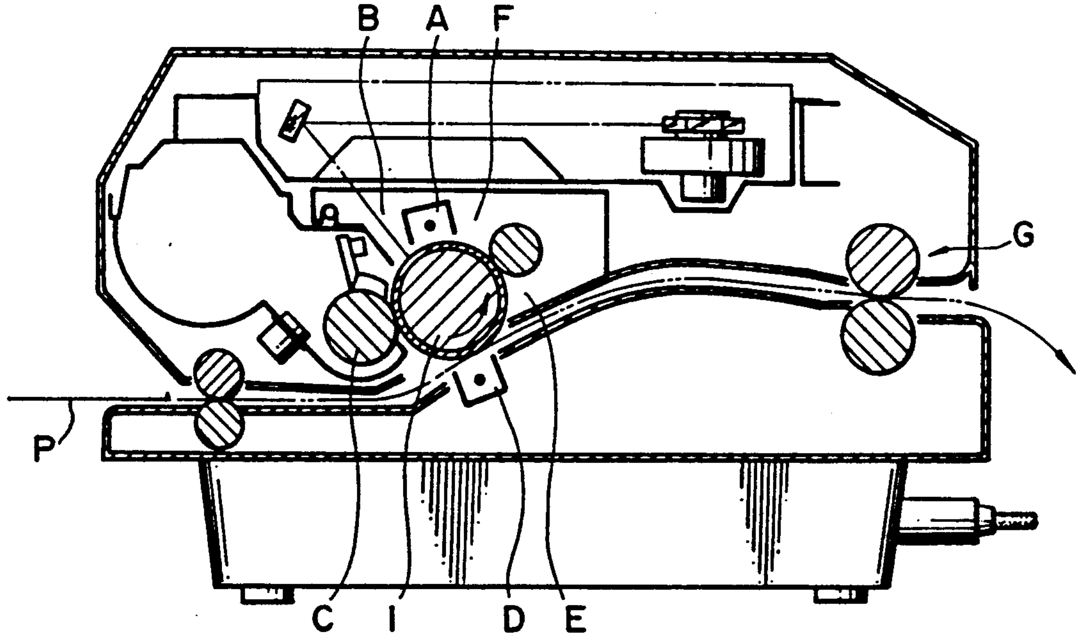
FIG. 1 PRIOR ART
FIG. 1 is a schematic side view illustrating the principal part of a conventional laser beam printer.
Figure 2:
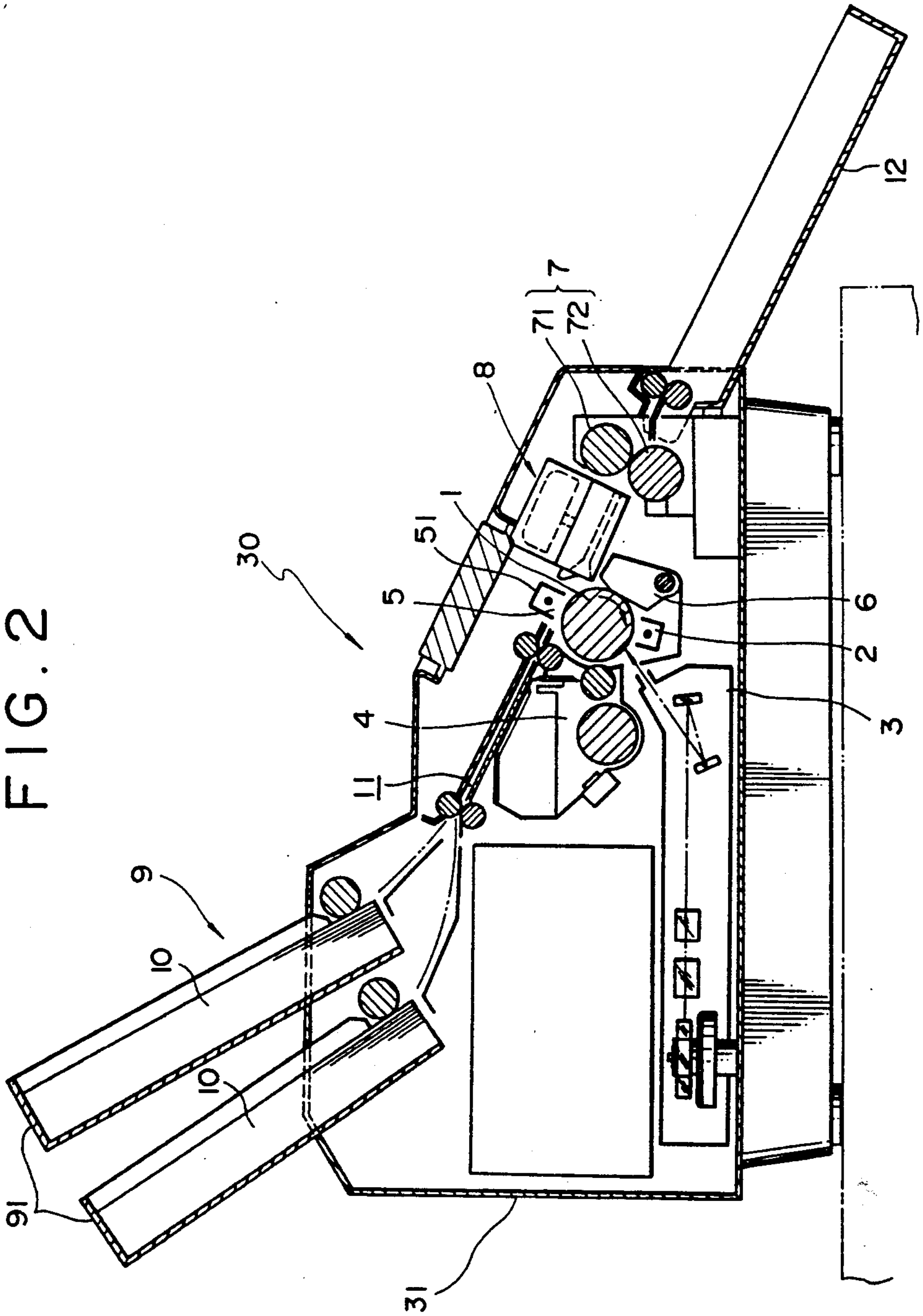
FIG. 2 is a schematic side view illustrating a laser beam printer embodying the present invention.

FIG. 2 is a schematic side view illustrating a laser beam printer employing a recording sheet guide mechanism according to the present invention.

Around a photoconductive drum 1 of the laser beam printer, according to the present invention are, the following units which are disposed along the direction of its rotation in the order described below: a charging station 2 for uniformly charging a photoreceptor on the surface of the photoconductive drum 1, an optical scanning system 3 for scanning the photoconductive surface of the drum 1 with a laser beam which is turned on and off according to image data, a developing station 4 for applying toner onto the photoreceptor portion exposed to the laser beam from the optical scanning system 3 and reduced to a latent image as it is freed of electric charges so as to convert the latent image to a toner image, a transfer station 5 for transferring the toner image to recording paper 10 by making a transfer charger 51 charge the recording paper 10, and a toner-cleaning station 6 for removing toner remaining on the surface of the photoconductive drum 1.

The recording paper 10 are accommodated in a recording paper cassette 91, which is fitted to a recording paper holding portion 9 at the upper portion of the printer.

The toner image formed on the surface of the photoconductive drum 1 is transferred to the recording paper 10 being traveled at a velocity identical with the circumferential speed of the photoconductive drum 1 between the photoconductive drum 1 and the transfer charger 51 of the transfer station 5.

The transfer station 5 is located above the photoconductive drum 1 as shown in FIG. 2. The toner image formed on the surface of the photoconductive drum 1 is transferred to the undersurface of the recording paper 10 being conveyed along a recording paper travel path from the recording paper holding portion 9. This arrangement is designed to exhaust the recording paper in a facedown condition by fixing the image, conveying and exhausting the recording paper 10 as it is printed (i. e., printed side down).

The recording paper 10 carrying the image thus transferred is guided by a recording paper guide mechanism 8, which will be described later, along the conveyance direction up to the fixing station 7, where the toner is fixed to the surface thereof, and ejected onto a paper exhausting tray 12 in a facedown condition.

The fixing unit 7 consists of a pair of rollers: a heat rollers 72 and a backup rollers 71. The recording paper 10 is sandwiched between the pair of rollers and the heat roller 72 is used to heat and fix the toner image on the surface of the recording paper 10. The heat rollers 72 is coupled to a drive means (not shown) and driven to rotate at a velocity identical with the circumferential speed of the photoconductive drum 1, whereby the recording paper 10 is also traveled. In other words, the fixing unit 7 is simultaneously used as a recording paper feeding mechanism.

The paper guide mechanism 8 is arranged between the transfer charger 51 and the fixing unit 7 for stably guiding the recording paper 10 therebetween.

As illustrated in detail in FIGS. 3 through 6, the paper support member or guide mechanism 8 comprises a guide plate 81 extending along and above the paper feed path 11, the length of which is enough to cover the range from the transfer charger 51 up to the fixing unit 7 while the width of which is enough to cover that of the recording paper 10, and a pair of edge holders or guide members 82L and 82R, respectively downwardly supported by the guide plate 81 at its respective side end.

The guide plate 81 has a flat undersurface and is provided with a pair of guide grooves 81A, 81A extending in the longitudinal direction along the front and rear sides of the upper surface thereof, respectively. In addition, a pair of slits 81B, 81B, each having a predetermined width are bored on a straight line symmetrically about the central portion of the guide plate 81. Further, the undersurface of the guide plate 81 is secured to a frame 20 of the printer 10 by means of a bracket, 22.

A pair of slide members 83L and 83R cut in length are slidably received by the guide grooves 81A and 81A, respectively.

The paper guides or edge holders 82L and 82R are projected through the respective slits 81B and secured to the slide member 83L and 83R, respectively. More specifically, the recording paper edge guides 82L, 82R are projected from the undersurface of the guide plate 81 and are movable in the longitudinal direction of the guide plate 81 as the slide members 83L, 83R are slid and moved.

A pair of rack portions or racks 83La, 83Ra are formed on the opposite sides of respective slide members 83L and 83R along the longitudinal direction thereof.

A gear unit 84, consisting of large gear 84B and small gear or pinion 84A integrally formed in tiers, is pivotally fitted to the surface of the central portion of the guide plate 81, and the racks 83La, 83Ra are respectively engaged with the symmetrical positions of the lower (small diameter) gear or penion 84A of the gear unit 84.

The upper (large diameter) gear 84B of the gear unit 84 is engaged with a gear 85A mated with and secured to a shaft of a drive means or pulse motor 85 fixed to the frame 20 of the printer by means of a bracket 21. When the gear unit 84 is driven to rotate as the pulse motor 85 is operated to rotate, the slide members 83L, 83R on both sides are caused to slide and move in directions in which they are separated and joined as the gear unit 84 is driven to rotate. In other words, the slide members 83L, 83R are caused to slide and move laterally so that they are separated and joined with the center of their range of recording paper conveyance (in the lateral direction) as a reference when the pulse motor 85 is driven to rotate. While being subjected to elastic deformation, a spring member 81C in this case is inserted between the slide members 83L, 83R and the side wall of the slide guide groove 81A of the guide plate 81 to bias the slide members 83L, 83R in the direction perpendicular to the sliding direction using its restoring force. The slide members 83L, 83R are thus prevented from backlashing and are simultaneously supplied with adequate resistance to their sliding movement.

Figure 6:
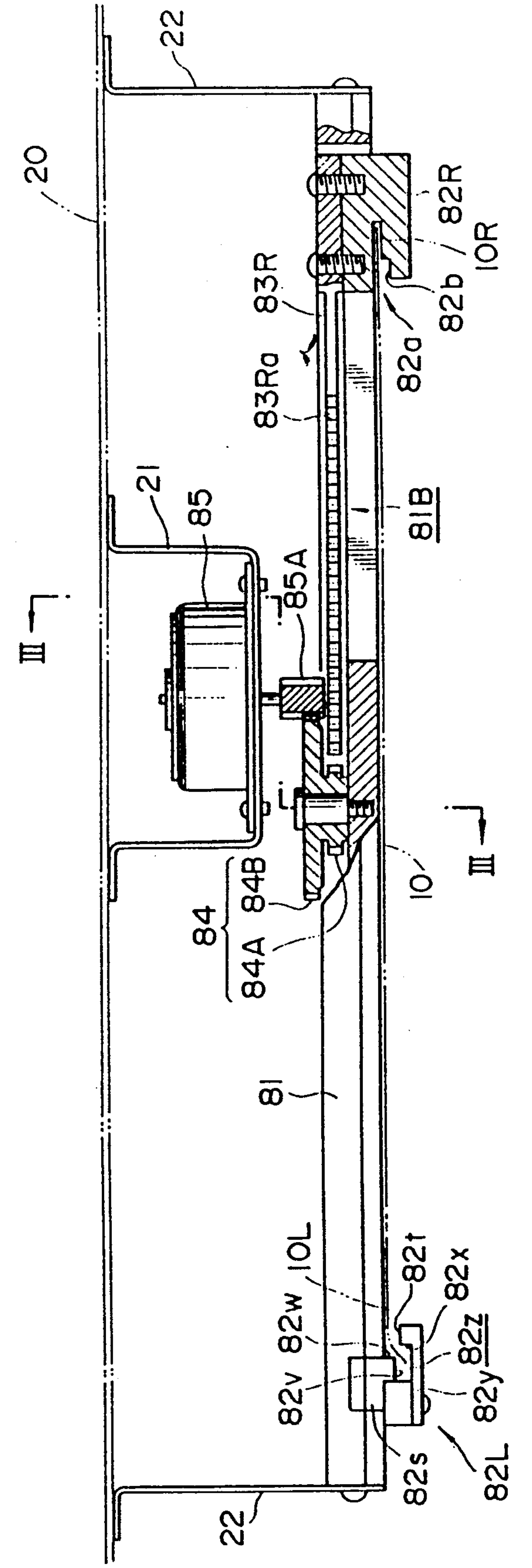
FIG. 6 is a diagram as viewed from arrow VI of FIG. 3.

The guide 82R shown on the right-hand side of FIG. 6, is provided with a guide slit 82*a* having a predetermined space along and under the undersurface of the guide plate 81 continuously in the direction of the paper feed path 11. The guide slit 82*a* is, as shown in FIG. 6, opened inwardly and provided with a step-down opened portion 82*b*.

On the other hand, the paper guide 82L, shown on the left-hand side of FIG. 6, is provided with a stepped portion 82*t* at the same level as that of the wide open stepped portion 82*b* of the right-hand side paper guide 82R on the inner opened side of a guide slit 82*z* having a predetermined width and continuous in the direction of the paper feed path 11. The rising portion 82*x* of an L-shaped metal fitting 82*y* is provided a predetermined space apart from the inner edge face 82*w* on the upper side of the guide slit 82*z* and set higher by a predetermined amount than an open upper edge 82*v*. More specifically, the guide slit 82*z* of the left-hand side paper guide 82L is continuous in the paper feed path 11. Thus, and as can be seen in FIG. 6, the left hand guide 82L defines an edge holding space that can be considered to be generally S-shaped in cross-section.

Figure 3:
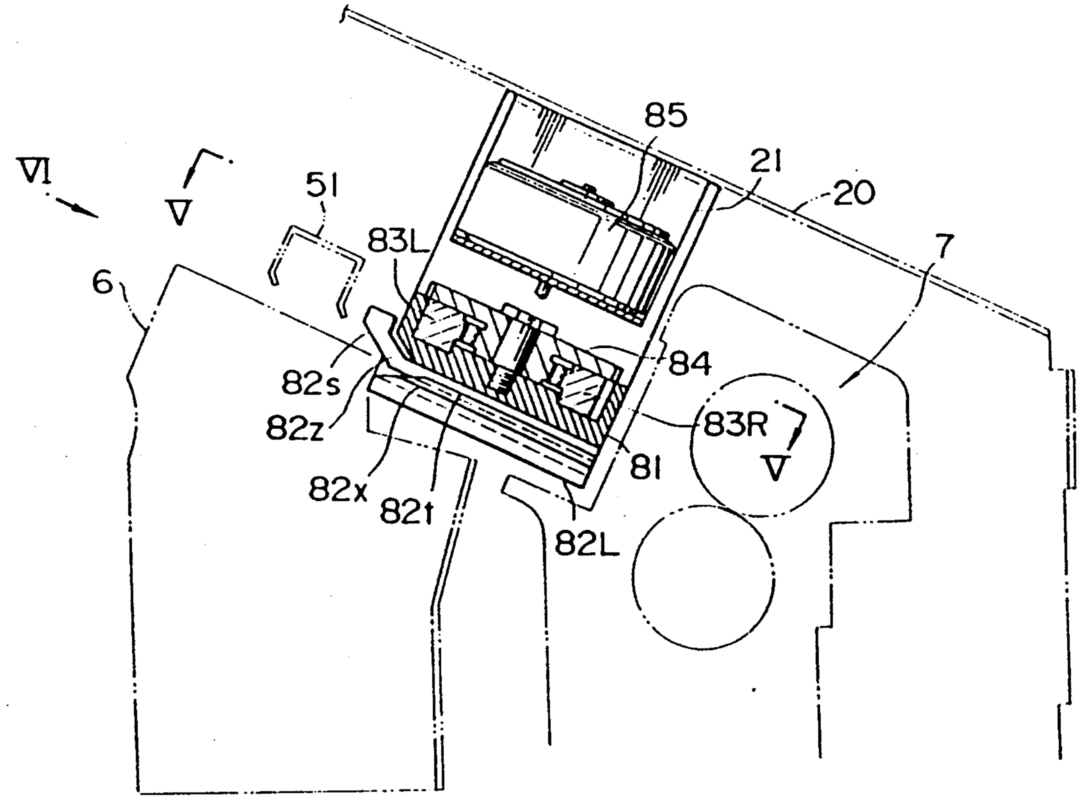
FIG. 3 is an enlarged sectional view of the recording sheet guide mechanism according to the present invention.
Figure 4:
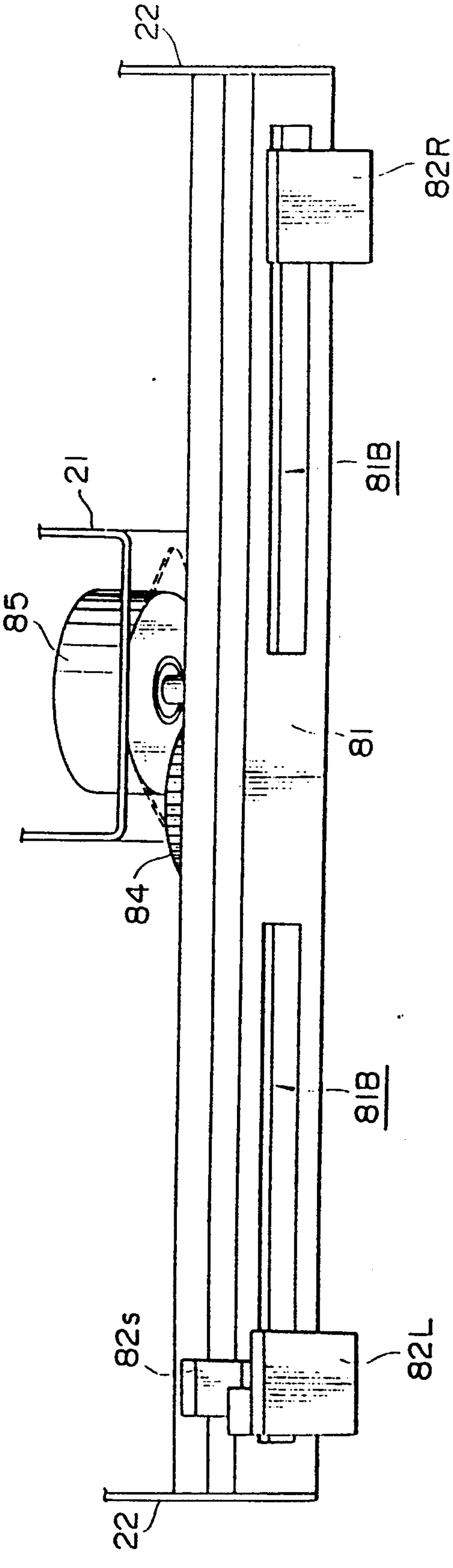
FIG. 4 is an elevational view of the recording sheet guide mechanism according to the present invention.
Figure 5:
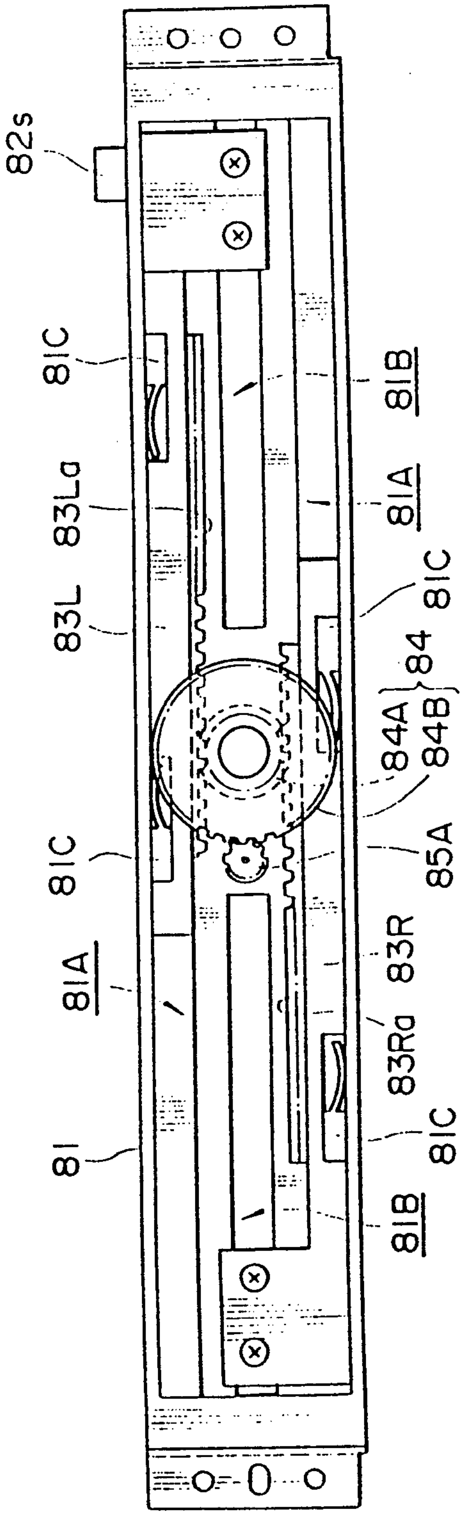
FIG. 5 is a diagram as viewed from arrow V of FIG. 3.

The upper side of the guide slit 82*z* is projected into the recording paper guide side and the projection 82*s* is, together with the stepped portion 82*t* and the end portion on the paper guide side of the rising portion 82*x* of the metal fitting 82*y* as shown in FIG. 3, provided in a tapered form expanding toward the recording paper guide, so that the end portion of the recording paper can readily be introduced into the guide slit 82*z*. This is also the case with the guide slit 82*a* of the paper guide 82R.

The paper guide mechanism 8 thus constructed operates to hold and guide, into the fixing unit 7, the recording paper 10 carrying the toner image transferred from the photoconductive drum 1 in the transfer station 5.

In FIG. 6, the right-hand side end 10R of the recording paper 10 is introduced into the guide slit 82*a* of the paper guide 82R, whereas the left-hand side end 10L thereof is bent in the form of an S and introduced into the crank-like guide slit 82*z* and into the generally S-shaped space defined by the paper guide 82L. The recording paper 10 is thus guided with both ends held and traveled along the undersurface of the guide plate 81 until it reaches the fixing unit 7.

In this way, one side end of the recording paper 10 is bent in the form of an S, whereas the other side end thereof is held by the guide slit 82*a*, whereby even soft recording paper 10, which tends to allow its central portion to hang down, can be properly held and guided.

When the width of the recording paper 10 is different, the paper guides 82L, 82R are moved by driving the pulse motor 85 to rotate and make the gap between both the paper guides 82L, 82R conform to the width of the recording paper to be guided.

When recording paper such as an envelope is too thick to be insertable into the guide slits 82*a*, 82*z*, the space between the paper guides 82L, 82R is set wider than that when normal recording paper is guided and the side ends of material to be guided (envelope in this case) is held with the wide-open stepped portions 82*b*, 82*t* of the guide slits 82*a*, 82*z* for guiding purposes. In other words, since the recording material that has to be held with the wide-open stepped portions 82*b*, 82*t* of the guide slits 82*a*, 82*z* is sufficiently rigid, it may be guided properly without being bent in the form of an S.

Although the paper guides 82L, 82R on both sides are arranged, in the aforementioned embodiment, so that they are proportioned with the central paper feed path 11 as a reference in order to deal with a recording paper that is different in size, only one of the paper guides may be moved with the other being fixed.

As set forth above, only the end portions of recording paper 10, where no image is formed, may be held by utilizing the rigidity of the recording paper itself, so that the recording paper carrying a toner image on its undersurface can be guided or held. Moreover, the paper holding member is made movable in the lateral direction of the recording paper, whereby recording paper of different sizes can readily be dealt with.

The recording paper carrying the unfixed image can thus be conveyed in facedown condition. The paper feed path 11, which is designed to exhaust the recording paper in a facedown condition can also be shortened. In other words, the printer intended to exhaust recording paper in a facedown condition is made more compact and free from trouble, such as paper-jamming.

What is claimed is:

1. An image recording apparatus wherein a recording medium is fed in a predetermined feed path, comprising a pair of edge holders opposedly arranged about said feed path for holding edge portions of said recording medium, one of said edge holders being provided with an edge holding space extending along said feed path and having a shape to force the recording medium to conform to a substantially S-shaped sectional configuration.

2. The apparatus according to claim 1, wherein at least one of said pair of edge holders is movable toward and away from the other one of said pair of edge holders so as to change the distance therebetween.

3. The apparatus according to claim 1, further comprising:

- a support member for supporting one of said edge holders, which is provided with a rack portion;
- a pinion arranged to mesh with said rack portion of said support member, said support member being moved in a direction perpendicular to said feed path when said pinion is rotated; and
- means for selectively rotating said pinion in a forward and reverse direction.

4. The apparatus according to claim 1, further comprising:

- a support member for supporting at least one of said edge holders, said support member being movable in a forward and reverse direction; and
- means for selectively driving said support member in said forward and reverse directions.

* * * * *

UNITED STATES PATENT AND TRADEMARK OFFICE

CERTIFICATE OF CORRECTION

PATENT NO. : 5,148,228

DATED : September 15, 1992

INVENTOR(S) : M. TAKANO

It is certified that error appears in the above-indentified patent and that said Letters Patent is hereby corrected as shown below:

At column 6, line 27 (claim 2, line 4) change "the" to ---a---.

At column 6, line 30 (claim 3, line 3) insert ---at least--- after "supporting".

Signed and Sealed this

Tenth Day of October, 1995

Attest:

Bruce Lehman

BRUCE LEHMAN

*Attesting Officer* *Commissioner of Patents and Trademarks*